US012594609B2

(12) United States Patent
Doi

(10) Patent No.: US 12,594,609 B2
(45) Date of Patent: Apr. 7, 2026

(54) HYDRO CHUCK

(71) Applicants:BIG DAISHOWA CO., LTD., Osaka (JP); BIG DAISHOWA SEIKI CO., LTD., Osaka (JP)

(72) Inventor: Masayuki Doi, Osaka (JP)

(73) Assignees: BIG DAISHOWA CO., LTD., Osaka (JP); BIG DAISHOWA SEIKI CO., LTD, Osaka (JP)

( * ) Notice: Subject to any disclaimer, the term of this patent is extended or adjusted under 35 U.S.C. 154(b) by 438 days.

(21) Appl. No.: 17/761,790

(22) PCT Filed: Sep. 20, 2019

(86) PCT No.: PCT/JP2019/036987
§ 371 (c)(1),
(2) Date: Mar. 18, 2022

(87) PCT Pub. No.: WO2021/053810
PCT Pub. Date: Mar. 25, 2021

(65) Prior Publication Data
US 2022/0331885 A1      Oct. 20, 2022

(51) Int. Cl.
B23B 31/30          (2006.01)
(52) U.S. Cl.
CPC ........ B23B 31/305 (2013.01); *B23B 2231/24* (2013.01)
(58) Field of Classification Search
CPC ............... B32B 31/305; B32B 31/1176; B32B 31/1178; B23B 2231/24; Y10T 279/1216
See application file for complete search history.

(56) References Cited

U.S. PATENT DOCUMENTS 3,427,036  A      2/1969  Siebelhoff
4,423,880  A      1/1984  Kosmowski
(Continued)

FOREIGN PATENT DOCUMENTS

CN          1412448  A      4/2003
DE      102009023672  A1      5/2010
(Continued)

OTHER PUBLICATIONS

International Search Report.
(Continued)

*Primary Examiner* — Sunil K Singh
*Assistant Examiner* — Eric Daniel Whitmire
(74) *Attorney, Agent, or Firm* — Dilworth & Barrese, LLP; Michael J. Musella, Esq.

(57)          ABSTRACT

A hydro chuck includes a shank portion provided on one end side in a longitudinal direction and having, on a leading end side thereof, a cylindrical chuck portion for gripping a gripped object and an operational portion provided on the other end side in the longitudinal direction and disposed in continuation from the shank portion. The shank portion is fixable by being inserted to a tool mount included in a machine tool. The chuck portion includes a sleeve gripping the gripped object and a fluid pressure chamber formed on an outer circumference side of the sleeve and filled with fluid, the chuck portion being configured such that in association with a rise of a pressure of the fluid inside the fluid pressure chamber, the sleeve is reduced in its diameter to grip the gripped object. The operational portion includes a communication passage communicated to the fluid pressure chamber and a pressurizing piston disposed in the communication passage and adjusting the pressure of the fluid inside the fluid pressure chamber.

2 Claims, 10 Drawing Sheets

(56)                        References Cited

U.S. PATENT DOCUMENTS

| | | | | |
|---|---|---|---|---|
| 5,237,895 A | * | 8/1993 | Danielsen | B23B 29/04 |
| | | | | 409/234 |
| 2003/0066564 A1 | | 4/2003 | Arisato | |
| 2016/0031015 A1 | | 2/2016 | Doi | |
| 2018/0333778 A1 | | 11/2018 | Wagner et al. | |
| 2018/0333787 A1 | * | 11/2018 | Wagner | B23B 31/302 |

FOREIGN PATENT DOCUMENTS

| | | | | | |
|---|---|---|---|---|---|
| DE | 102017120308 A1 | 3/2019 | | | |
| EP | 0227620 A2 | 7/1987 | | | |
| EP | 1649956 A1 | * | 4/2006 | | B23B 31/305 |
| EP | 1792679 A2 | 6/2007 | | | |
| EP | 2985099 A1 | 2/2016 | | | |
| JP | H5-500030 A | 1/1993 | | | |
| JP | H8-510174 A | 10/1996 | | | |
| JP | H10-29106 A | 2/1998 | | | |
| JP | 2010155319 A | * | 7/2010 | | |
| JP | 2011-45963 A | 3/2011 | | | |
| TW | 200603924 A | 2/2006 | | | |
| WO | WO-9426448 A1 | * | 11/1994 | | B23B 31/305 |
| WO | 95/26247 A1 | 10/1995 | | | |
| WO | 2005/115665 A1 | 12/2005 | | | |

OTHER PUBLICATIONS

Written Opinion of ISA.
Written Opinion of IPEA.
IPRP(Chapter II).
Supplementary European Search Report issued on May 8, 2023 in EP 19945427.3.
Office Action issued Mar. 25, 2024 in Taiwan appln. 109130859.

* cited by examiner

HYDRO CHUCK

FIELD OF THE INVENTION

The present invention relates to a hydro chuck configured to reduce a diameter of a sleeve placed on an inner circumference side of a fluid pressure chamber in association with feeding of fluid pressurized by a pressurizing piston into the fluid pressure chamber.

DESCRIPTION OF RELATED ART

Conventionally, as a chuck, there has been employed a hydro chuck configured to grip a "gripped object" (i.e. an object to be gripped) such as a cutting tool with use of e.g. an oil pressure (for instance, Patent Document 1). With such hydro chuck, since an area for installing its requisite mechanisms such as a fluid pressure chamber is small, the size of the gripping mechanism as a whole is made compact.

The hydro chuck is sometimes used in a Swiss type automatic lathe. The Swiss type automatic lathe is a machine tool suitable for e.g. carrying out a continuous work on a slender elongated bar-like object. Patent Document 2 discloses a hydro chuck that can be mounted to a tool mount (tool post) of a machine tool such as a Swiss type automatic lathe. In the hydro chuck disclosed in Patent Document 2, on an outer circumference side of a chuck portion gripping a cutting tool, there is provided an operational unit accommodating a pressurizing piston therein. With a change of the position of the pressurizing piston, pressure of fluid in a fluid pressure chamber provided in the chuck portion is adjusted. With the Swiss type automatic lathe, a plurality of hydro chucks are mounted to the tool mount (tool post) and the respective hydro chucks grip different tools. Thus, with the Swiss type automatic lathe, a workpiece (work) such as a bar-like object or the like can be machined continuously with use of the plurality of cutting tools mounted to the tool mount.

BACKGROUND ART DOCUMENTS

Patent Documents

Patent Document 1: Japanese Unexamined Patent Application Hei. 10-29106
Patent Document 2: European Patent Application Publication No. 1792679

SUMMARY

Problem to be Solved by Invention

With the Swiss type automatic lathe described above, there is observed a tendency of increasing of the number of cutting tools in association with improvement of performance thereof, so a plurality of cutting tools are arranged in close vicinity in the tool mount. In this regard, in the case of the hydro chuck disclosed in Patent Document 2, on the outer circumference side of the chuck portion gripping a cutting tool, there is disposed the operational portion accommodating the pressurizing piston with an outside diameter formed larger than a chuck attaching hole. Thus, the hydro chuck is to be mounted to the tool mount from the side of the workpiece to be machined, so in case the cutting tool gripped at the chuck portion is to be removed for its replacement, it is necessary to operate the pressurizing piston of the operational portion with paying attention to the other cutting tools and/or the other chuck portions adjacent thereto. Moreover, in case the space between the tool mount and the workpiece to be machined is limited, replacement of a cutting tool needs to be done after dismounting the hydro chuck per se from the tool mount, for the sake of emphasis placed on safety. Thus, the operability of the hydro chuck would tend to be low.

In the first place, in order to insert a hydro chuck gripping a cutting tool to the tool mount from the side of the workpiece, a free space larger at least than the sum of the protruding length of the cutting tool from the hydro chuck and the total length of the hydro chuck. For this reason, it is not possible to attach a cutting tool having a protruding length equal to or greater than a predetermined length to the hydro chuck. Further, in case the outside diameter of the operational portion in the hydro chuck is so large as to interfere with e.g. the other cutting tools or other chuck portions adjacent thereto, mounting of such hydro chuck to the tool mount is impossible.

In view of the above-described state of the art, there is a need for a hydro chuck that allows an attaching/detaching operation of a gripped object fixed to a tool mount of a machine tool to be carried out in a safe and easy manner.

Solution

According to a characterizing feature of a hydro chuck relating to the present invention, the hydro chuck comprises:
  a shank portion provided on one end side in a longitudinal direction and having, on a leading end side thereof, a cylindrical chuck portion for gripping a gripped object;
  an operational portion provided on the other end side in the longitudinal direction and disposed in continuation from the shank portion;
  the shank portion being fixable by being inserted to a tool mount included in a machine tool;
  the chuck portion including a sleeve gripping the gripped object and a fluid pressure chamber formed on an outer circumference side of the sleeve and filled with fluid, the chuck portion being configured such that in association with a rise of a pressure of the fluid inside the fluid pressure chamber, the sleeve is reduced in its diameter to grip the gripped object; and
  the operational portion including a communication passage communicated to the fluid pressure chamber and a pressurizing piston disposed in the communication passage and adjusting the pressure of the fluid inside the fluid pressure chamber.

With the above-described configuration, when the hydro chuck is fixed to a tool mount of a machine tool, the operational portion is disposed on the side opposite to the chuck portion across the tool mount of the machine tool therebetween. This side opposite to the chuck portion across the tool mount is not opposed to a workpiece to be worked and the chuck portion or the gripped object such as a cutting tool is not present there, either. Therefore, with the hydro chuck having the above-described inventive configuration, it is easy to secure, around the operational portion, a free space for operating the pressurizing piston for adjusting the pressure of the fluid inside the fluid pressure chamber. Consequently, in the hydro chuck, the operability of the pressurizing piston at the time of attachment/detachment of the gripped object can be improved in terms of safety easily. Also, in case a plurality of hydro chucks are fixed to the tool mount, a plurality of operational portions may be disposed in close vicinity each other on the side opposite to the chuck portions across the tool mount. However, since the operational portions are not placed in opposition to a workpiece to be worked, a free space for operating the pressurizing piston can be secured easily by only causing each operational portion not to coincide with the other operational portions adjacent thereto. Therefore, even if a plurality of hydro chucks are fixed to the tool mount of the machine tool, the attaching and detaching operations of the gripped object can be carried out easily.

According to a further characterizing feature of the present invention, the operational portion has a portion which protrudes radially outward beyond the shank portion.

With the above-described arrangement, if a chuck attaching hole (a through hole) having an outside diameter same as that of the shank portion is formed in the tool mount of the machine tool, when the hydro chuck is inserted to this chuck attaching hole of the tool mount from the side of the shank portion, the operational portion can be disposed outside the tool mount. With this, by providing the portion protruding radially outward beyond the shank portion with such a shape that can come into contact with the outer face of the tool mount, this protruding portion can serve as a "stopper" when the hydro chuck is to be mounted to the tool mount by inserting the shank portion to the chuck attaching hole.

According to a still further characterizing feature of the present invention, the operational portion includes a coolant hole connectable to a supply source of coolant and a coolant passage communicated to the coolant hole and supplying the coolant to the inner circumference side of the sleeve.

With the above-described arrangement, the hydro chuck as being mounted to the tool mount of the machine tool, allows supplying of coolant to the gripped object from the operational portion disposed on the side opposite to the chuck portion relative to the tool mount. In this way, in this hydro chuck, as its mechanism for supplying coolant is present on the same side as its operational portion, the hydro chuck can be operated easily.

According to a still further characterizing feature of the invention, of the communication passage, a first communication passage thereof accommodating the pressurizing piston and extending along an operational direction of the pressurizing piston is provided with an inclination toward the side opposite to the shank portion, relative to a direction perpendicular to an axis of the shank portion.

If the first communication passage accommodating the pressurizing piston is arranged in the direction perpendicular to the axis of the chuck portion, the length of the operational portion in the longitudinal direction which is along the axis of the chuck portion can be minimized. However, in case a plurality of hydro chucks are present in close vicinity with each other in the tool mount of the machine tool, such arrangement of the first communication passage in the direction perpendicular to the axis of the chuck portion can present an inconvenience that this arrangement may interfere with an operation of a tool by an operational portion of an adjacent hydro chuck when the pressurizing piston is operated with using the tool from the outside of the operational portion. For this reason, in the above-described inventive arrangement, the first communication passage is provided with an inclination toward the side opposite to the shank portion, relative to a direction perpendicular to an axis of the chuck portion. With this arrangement, when the pressurizing piston is to be operated by a tool from the outside of the operational portion, the tool can be operated with avoiding interference with the operational portion of the adjacent hydro chuck. As a result, with this hydro chuck, the operability of the operational portion in operating the pressurizing piston can be further improved.

EMBODIMENT

Next, an embodiment of a hydro chuck relating to the present invention will be explained with reference to the accompanying drawings.

First Embodiment

Figure 1:
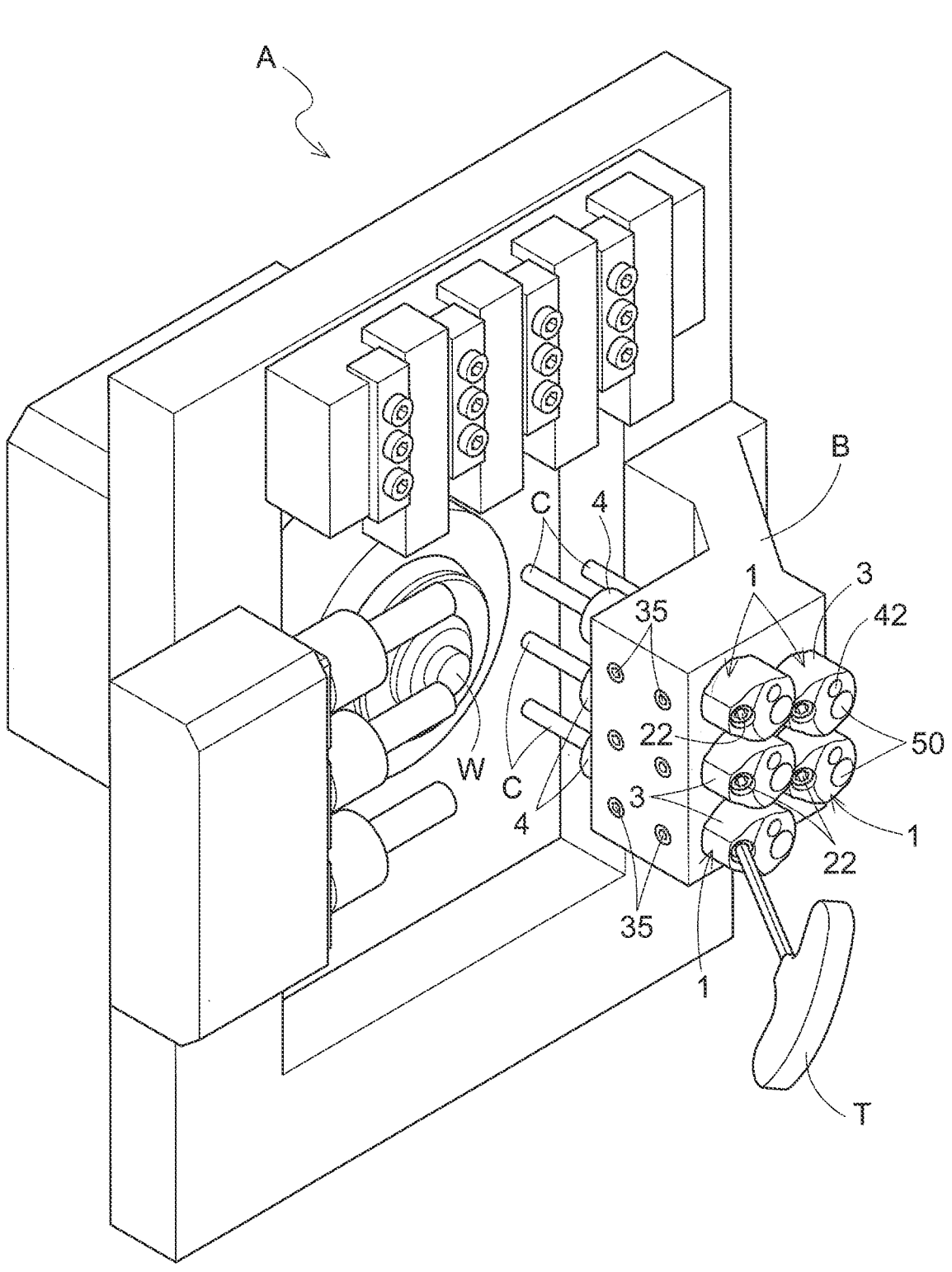
FIG. 1 is a schematic showing hydro chucks mounted to a tool mount (tool post) of a Swiss type automatic lathe.

FIG. 1 shows an example of a Swiss type automatic lathe A including a tool mount (tool post) B for cutting tools C. A plurality of hydro chucks 1 are arranged on the tool mount B and various kinds of cutting tools C (an example of a "gripped object", to be referred to simply as a "tool C" hereinafter) for carrying out such operations as cutting, milling etc. on a workpiece (work) W are gripped by the respective hydro chucks 1. In this way, the hydro chuck 1 is configured to be fixable with its shank portion 2 being inserted to the tool mount B of the Swiss type automatic lathe A. With this Swiss type automatic lathe A in operation, the workpiece W as being gripped by a chuck of the lathe is rotated and also the tool mount B including the plurality of tools C is moved toward the workpiece W. With this, continuous works on the workpiece W by the plurality of tools C is made possible.

Figure 2:
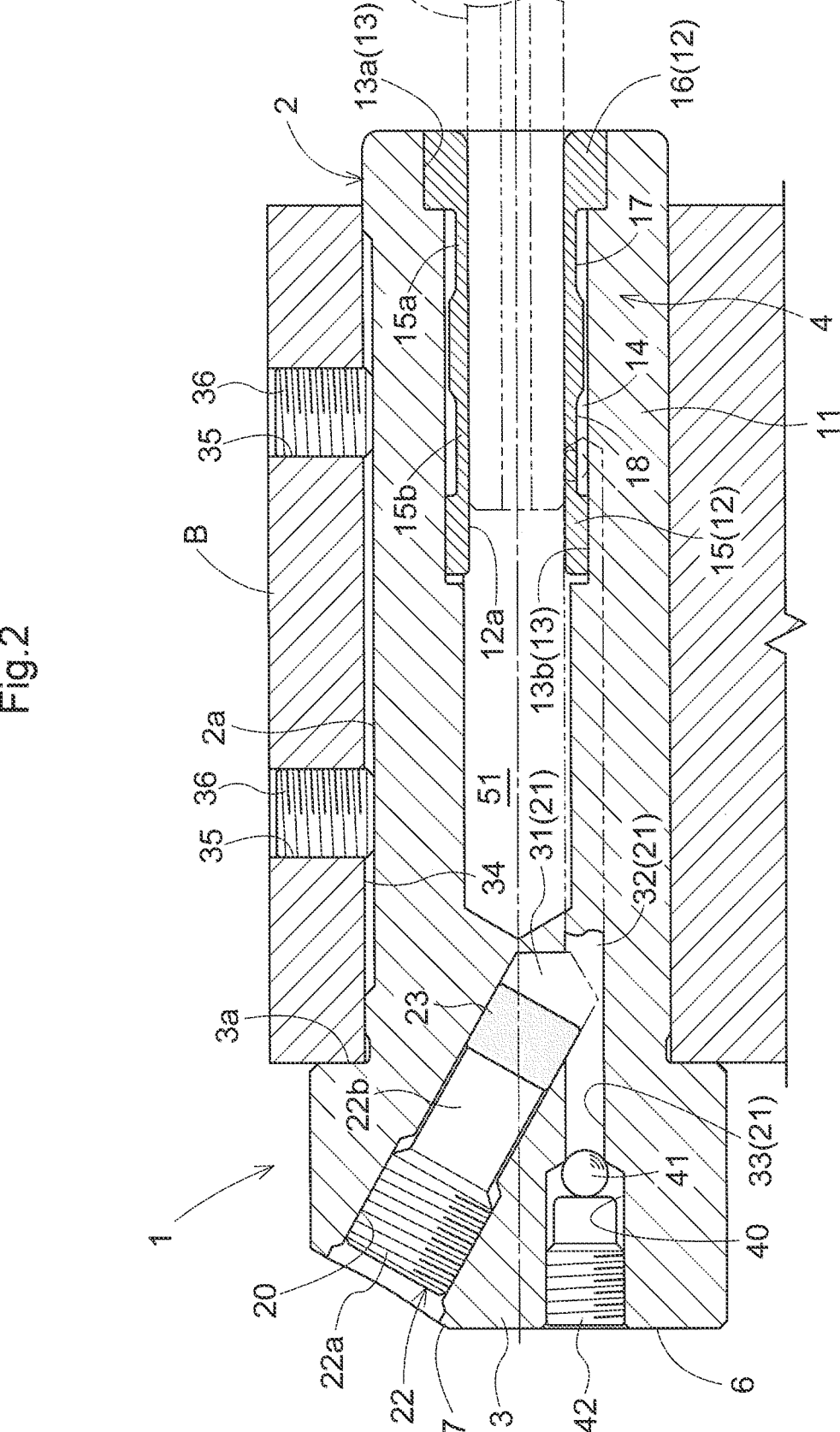
FIG. 2 is a section view of a hydro chuck as being fixed to the tool mount.

As shown in FIGS. 2-10, the hydro chuck 1 includes the shank portion 2 provided on one end side in the longitudinal direction and an operational portion 3 provided on the other end side in the longitudinal direction. The operational portion 3 includes a portion 3a which protrudes radially outwards beyond the shank portion 2. As shown in FIG. 1 and FIG. 2, in the tool mount B, there are formed chuck attaching holes 34 in the form of through holes to which the hydro chucks 1 are to be inserted and a plurality of screw holes 35 extending from the side face through to the chuck attaching holes 34. In each screw hole 35, a clamping screw 36 is to be fitted. In the hydro chuck 1, a flat face portion 2*a* is formed at a part of the outer circumference of the shank portion 2 (see FIG. 4), and this flat face portion 2*a* is provided along an axis X of the shank portion 2. When the hydro chuck 1 is to be fixed to the tool mount B, the shank portion 2 is inserted to the chuck attaching hole 34 from the side opposite to the workpiece W of the tool mount B relative to the chuck attaching hole 34 and then the clamping screw 36 is threaded in through the screw hole 35 to come into contact with a flat face portion 2*a*.

Figure 3:
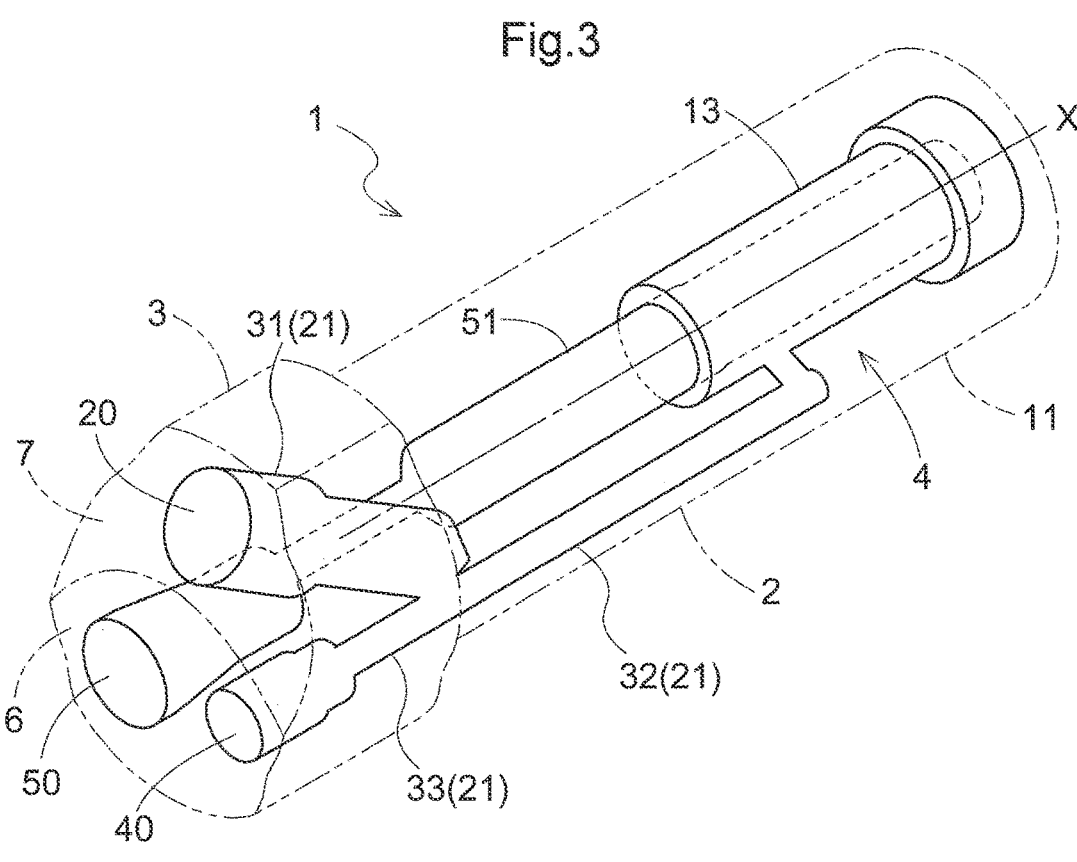
FIG. 3 is a perspective transparent view showing an inner arrangement of the hydro chuck.
Figure 4:
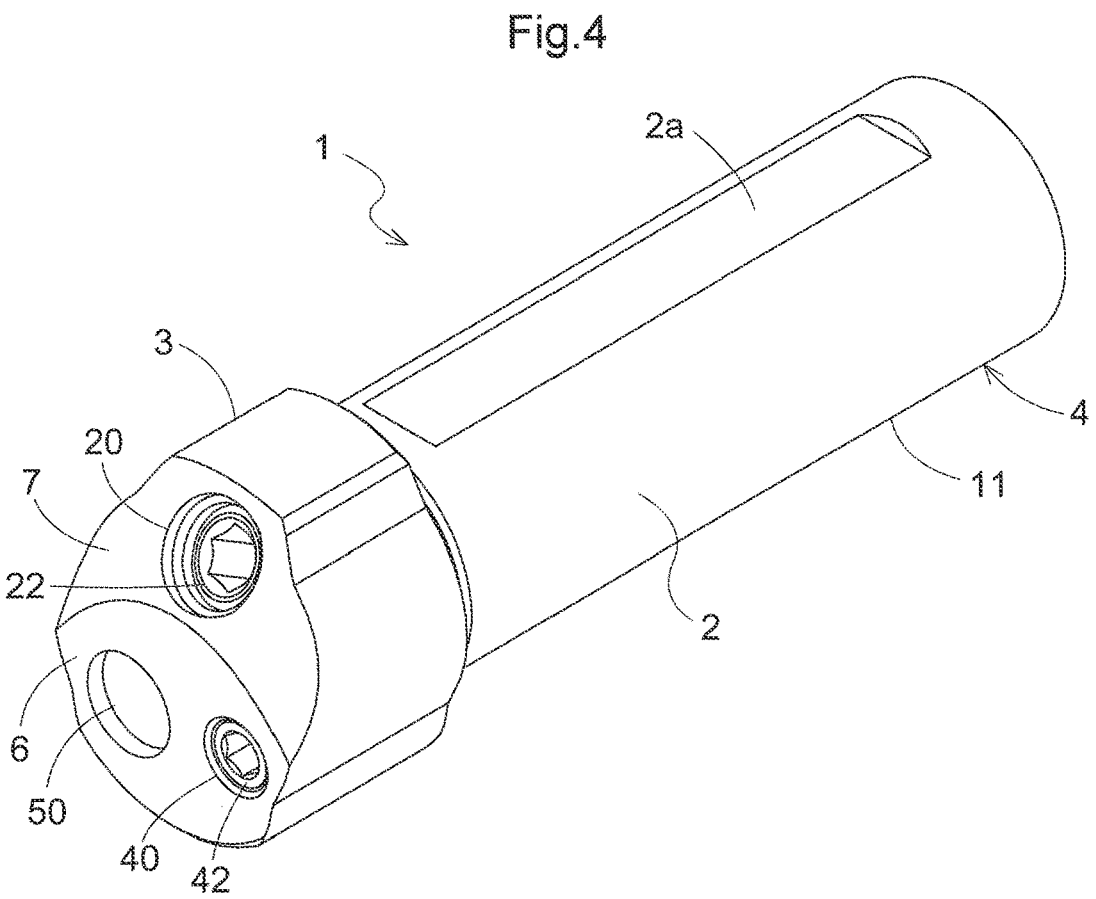
FIG. 4 is a perspective view of the hydro chuck.
Figure 5:
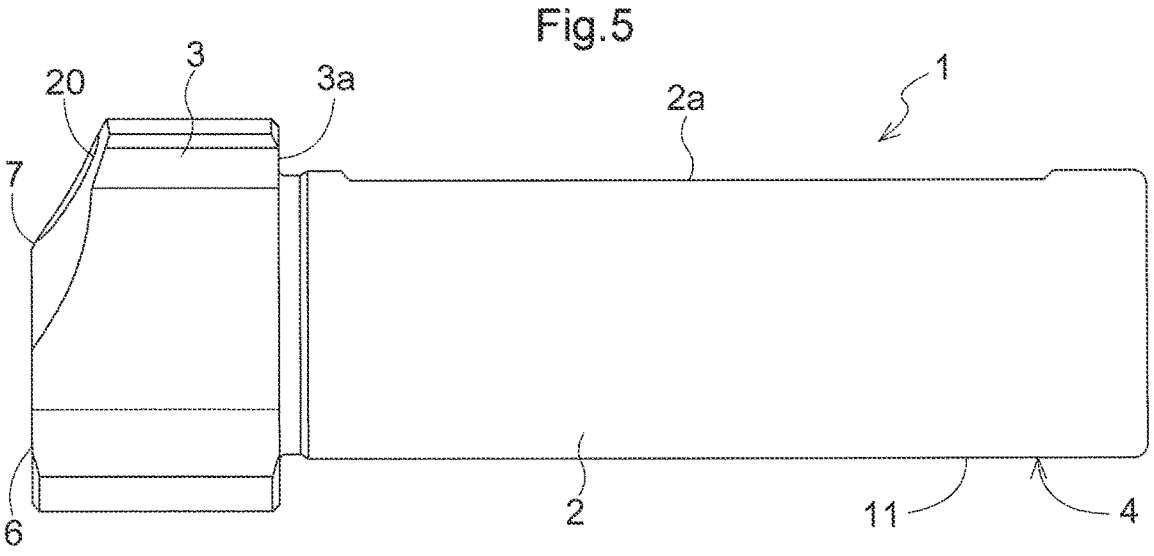
FIG. 5 is a front view of the hydro chuck.
Figure 6:
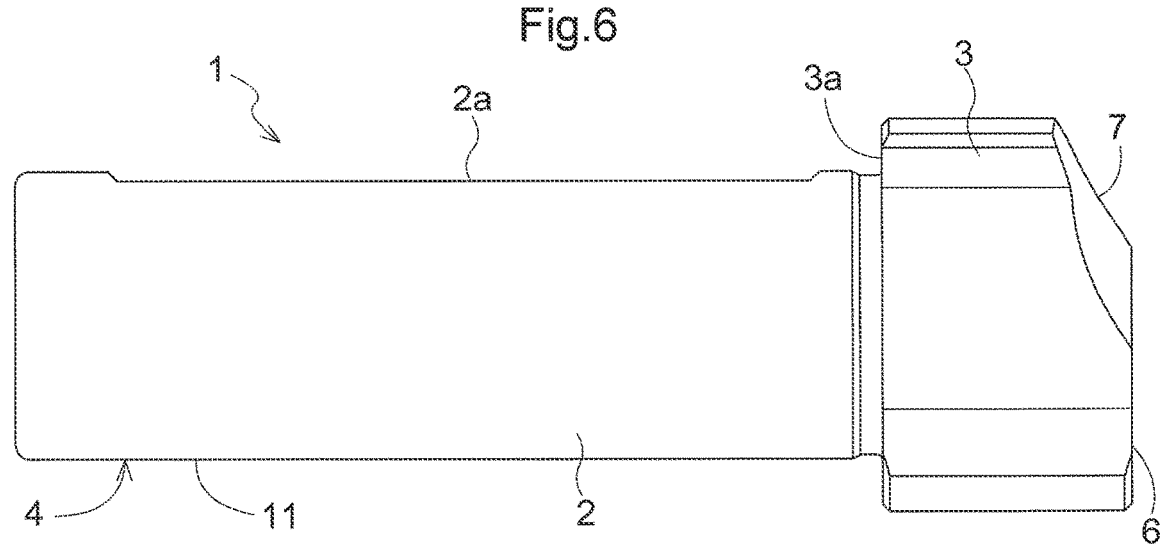
FIG. 6 is a rear view of the hydro chuck.
Figure 7:
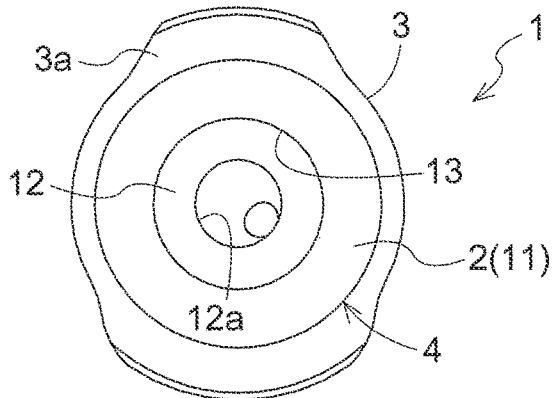
FIG. 7 is a right side view of the hydro chuck.
Figure 8:
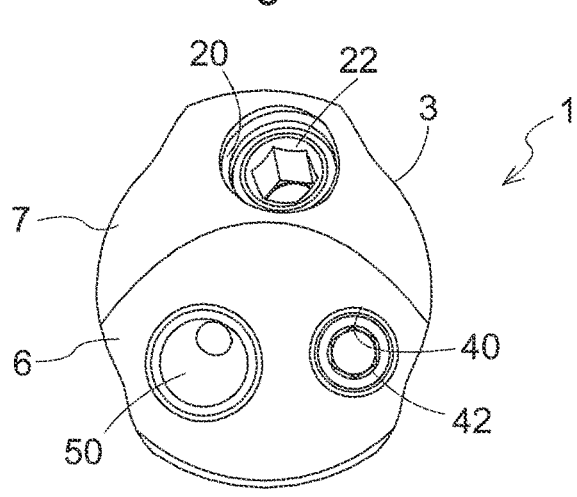
FIG. 8 is a left side view of the hydro chuck.
Figure 9:
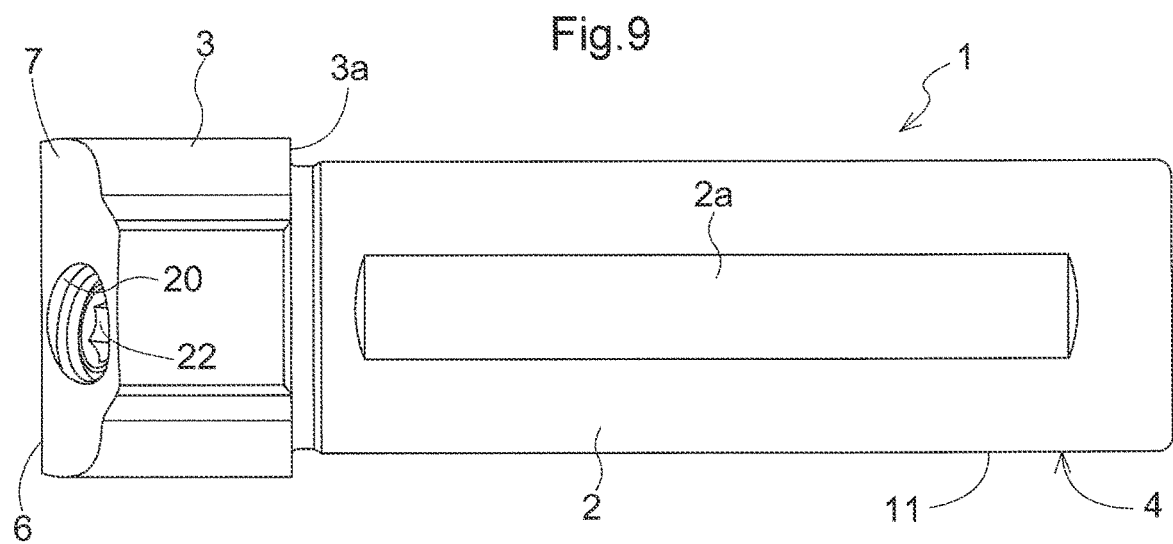
FIG. 9 is a plan view of the hydro chuck.
Figure 10:
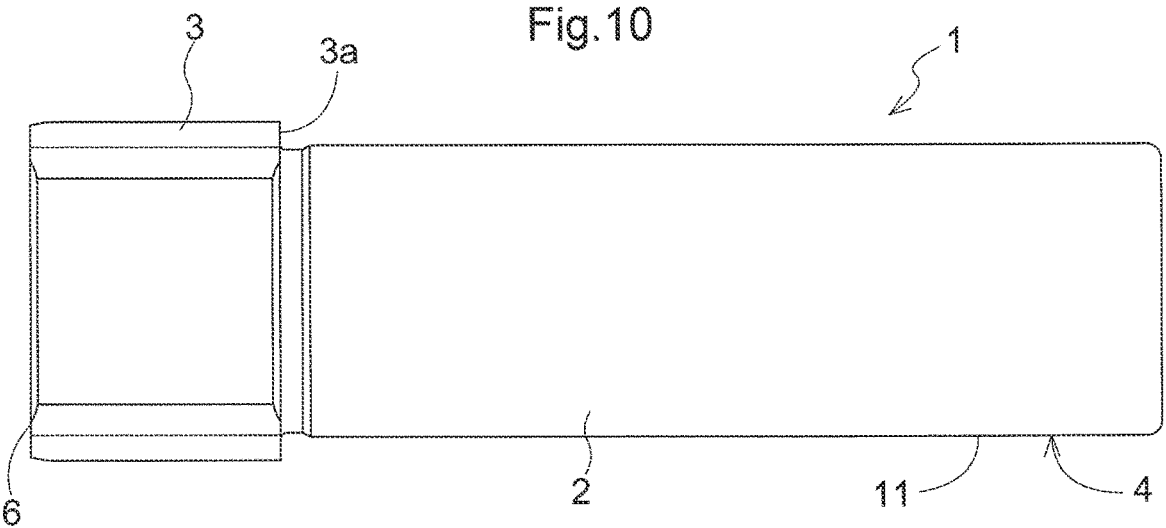
FIG. 10 is a bottom view of the hydro chuck.

As shown in FIGS. 2-4, the shank portion 2 of the hydro chuck 1 includes a cylindrically shaped chuck portion 4 for gripping the tool C on its leading end side. The chuck portion 4 is constituted of a tubular portion 11 and a sleeve 12 disposed on the inner circumference side of the tubular portion 11. In the tubular portion 11 and on the inner circumference side thereof, there is formed a sleeve receiving portion 13 having a cylindrical space provided along the direction of the axis X of the chuck portion 4. The sleeve 12 includes an insertion hole 12*a* to which the tool C is inserted, coaxially with the axis X of the chuck portion 4. The sleeve 12 is engaged into the sleeve receiving portion 13 from the leading end side of the tubular portion 11. This sleeve 12 engaged in the sleeve receiving portion 13 forms, relative to the sleeve receiving portion 13, a fluid pressure chamber 14 to be filled with a fluid such as water, oil, etc. In this way, the chuck portion 4 is constituted of the sleeve 12 and the fluid pressure chamber 14.

As shown in FIG. 2, the sleeve 12 includes a sleeve body 15 and a flange 16 coming into contact with a leading end side of the tubular portion 11. The sleeve receiving portion 13 formed in the tubular portion 11 includes a flange accommodating portion 13*a* and a sleeve accommodating portion 13*b*. The flange accommodating portion 13*a* is provided on the leading end side of the tubular portion 11 and accommodating a flange 16 of the sleeve 12. The sleeve accommodating portion 13*b* is provided to extend from the flange accommodating portion 13*a* toward the base of the shank portion 2 and accommodating the sleeve body 15 of the sleeve 12. The sleeve 12 is joined to the tubular portion 11 via e.g. brazing between the flange 16 and the flange accommodating portion 13*a*. The sleeve 12 and the tubular portion 11 may be joined to each other with using other "adhesive" also.

As shown in FIG. 2, in the sleeve 12, in the outer circumference of the sleeve body 15, two annular grooves 17, 18 are formed with a spacing therebetween in the direction along the axis X of the chuck portion 4 and these two annular portions 17, 18 together form reduced thickness portions 15*a*, 15*b* in the sleeve body 15. The two annular grooves 17, 18 and the sleeve accommodating portion 13*b* together form the fluid pressure chamber 14. When the pressure of fluid inside the fluid pressure chamber 14 builds up, the reduced thickness portions 15*a*, 15*b* bulge toward the axis X, thus reducing the diameter of the sleeve 12 to the inner circumference side.

Incidentally, the sleeve 12 is not limited to the form shown in FIG. 2. Alternatively, with formation of a single annular groove in the outer circumference, the reduced thickness portion may be formed continuous in the direction along the axis X.

As shown in FIGS. 2-4, the operational portion 3 of the hydro chuck 1 includes, in its outer face, a first screw hole 20, a second screw hole 40 as an air bleeding hole, and a coolant hole 50. The operational portion 3 includes a communication passage 21 communicated to the fluid pressure chamber 14, and the first screw hole 20 and the second screw hole 40 are communicated respectively to the communication passage 21. The operational portion 3 includes, as end faces thereof extending in the axis X direction of the chuck portion 4, a first face portion 6 perpendicular to the axis X direction and a second face portion 7 inclined toward the chuck portion 4 side relative to the first face portion 6. The first screw hole 20 is formed in the direction perpendicular to the second face portion 7, whereas the second screw hole 40 and the coolant hole 50 are formed in the first face portion 6.

The communication passage 21 includes a first communication passage 31, a second communication passage 32 and a third communication passage 33. The first communication passage 31 is formed in communication to the first screw hole 20 and accommodates a screw member 22 to be described later and is disposed in a direction transverse to the axis X of the chuck portion 4. The first communication passage 31 and the first screw hole 20 are formed coaxially. The second communication passage 32 is communicated to an end portion of the first communication passage 31 and is disposed in the direction along the axis X of the chuck portion 4 in communication with the fluid pressure chamber 14. Namely, the second communication passage 32 is provided to extend from the operational portion 3 to the shank portion 2. The third communication passage 33 is formed in communication with the second screw hole 40 and accommodates a screw member 42 to be described later and is disposed in the direction along the axis X of the chuck portion 4. The third communication passage 33 and the second screw hole 40 are formed coaxially. An end of the third communication passage 33 is communicated to the second communication passage 32. The inside diameter of the first communication passage 31 is set smaller than the inside diameter of the first screw hole 20 and the inside diameter of the third communication passage 33 is set smaller than the inside diameter of the second screw hole 40. In this embodiment, the third communication passage 33 is formed coaxially with the second communication passage 32.

In the first screw hole 20, there is fitted the screw member 22 (an example of a "pressurizing piston") having a head portion 22*a* and a leading end portion 22*b* with a smaller diameter than the head portion 22*a*. At the head portion 22*a* of the screw member 22, a screw (threaded) portion is formed. In the outer circumference of the leading end portion 22*b* of the screw member 22, there is provided a sealing member 23 such as an O-ring.

In the operational portion 3, there are provided the two holes, i.e. the first screw hole 20 and the second screw hole 40 as openable/closable fluid inlet holes. With this arrangement, the hydro chuck 1 can fill the fluid pressure chamber 14 with fluid in reliable manner without allowing air to remain inside the fluid pressure chamber 14.

The screw member 22 (pressurizing piston) is inserted to the first screw hole 20 from the leading end portion 22*b*, and as the threaded portion of the head portion 22*a* is threaded into the first screw hole 20, the leading end portion 22*b* is pushed into the first communication passage 31. With this, in the screw member 22, the sealing member 23 at the leading end portion 22*b* thereof is placed in gapless contact with the entire inner circumference of the first communication passage 31. As a result, the fluid such as water, oil, etc. will be sealed within from the fluid pressure chamber 14 to the communication passage 21 continuously.

As shown FIG. 1 and FIG. 2, the screw member 22 accommodated within the first communication passage 31 may be rotatably operated about the axis of the screw member 22 with use of a wrench T (an example of a rotational operational tool), whereby the threading-in amount thereof to the first screw hole 20 and the communication passage 21 can be adjusted.

If the volume of the communication passage 21 is reduced by increasing the threading-in amount of the screw member 22, there occurs rise in the pressure of the fluid sealed between the communication passage 21 and the fluid pressure chamber 14. With this, the reduced-thickness portions 15*a*, 15*b* of the sleeve body 15 bulge toward the inner circumference side to reduce the diameter of the sleeve 12, so the hydro chuck 1 can strongly grip the tool C at the chuck portion 4.

Conversely, if the volume of the communication passage 21 is increased by decreasing the threading-in amount of the screw member 22, there occurs a drop in the pressure of the fluid sealed between the communication passage 21 and the fluid pressure chamber 14. With this, in the hydro chuck 1, the sleeve 12 resiliently returns to its larger-diameter side toward the fluid pressure chamber 14, thus reducing the gripping force of the chuck portion 4. So, the tool C can now be removed from the chuck portion 4.

As described above, in the Swiss type automatic lathe A, as the hydro chuck 1 is fixed with its shank portion 2 being inserted to the chuck attaching hole 34 of the tool mount B, the operational portion 3 is located on the side opposite to the chuck portion 4 across the tool mount B therebetween. On this side where the operational portion 3 is located which is opposite to the chuck portion 4 across the tool mount B, is not opposed to the workpiece W and no tool C is present there, either. For this reason, with this hydro chuck 1, it is readily possible to secure, around the operational portion 3, free space for operating the screw member 22 which adjusts the pressure of the fluid inside the fluid pressure chamber 14. Moreover, the screw member 22 is attached in the direction perpendicular to the second face 7. Therefore, with this hydro chuck 1, safety in the operability of the screw member 22 at the time of attachment or detachment of the tool C can be improved easily. Furthermore, as shown in FIG. 1, in case a plurality of hydro chucks 1 are fixed to the tool mount B, it is possible to secure a space for operating the screw member 22 only by this operational portion 3 not to coincide with the adjacent operational portion 3. Therefore, with this hydro chuck 1, even when a plurality of hydro chucks 1 are fixed to the tool mount B, attaching and detaching operations of the tools C can be carried out easily.

In this embodiment, in the hydro chuck 1, the operational portion 3 includes the portion 3*a* which protrudes radially outwards beyond the shank portion 2. With this arrangement, if a chuck attaching hole 34 having the same diameter as the outside diameter of the shank portion 2 is formed in the tool mount B, the hydro chuck 1 may be arranged with the operational portion 3 being disposed on the outer side of the tool mount B, with insertion and fixation of the hydro chuck 1 to the chuck attaching hole 34 of the tool mount B from the shank portion 2 side. And, since the portion 3*a* protruding radially outwards beyond the shank portion 2 in the operational portion 3 has such shape that allows contact with the outer face of the tool mount B, this protruding portion 3*a* can be used as a "stopper" at the time of attachment of the hydro chuck 1 to the tool mount B with insertion of the shank portion 2 to the chuck attaching hole 34.

As shown in FIG. 3, of the fluid communication passage 21, in the operational portion 3, the first communication passage 31 accommodating the screw member 22 and extending along the operational direction of this screw member 22 is provided to transverse the axis X of the chuck portion 4. In addition, the first communication passage 31 is provided with an inclination to the side opposite to the shank portion 2, with respect to the direction perpendicular to the axis X of the chuck portion 4.

In the operational portion 3 of the hydro chuck 1, the circumference of the area where the first communication passage 31 accommodating the screw member 22 is present has necessarily lower strength than the area not having this first communication passage 31. Therefore, if the first communication passage 31 is present only in the region near the outer circumference side of the operational portion 3, the strength of the operational portion 3 becomes lower. On the other hand, in this embodiment, in the operational portion 3 of the hydro chuck 1, the first communication passage 31 accommodating the screw member 22 is provided in such a manner as to transverse the axis X of the chuck portion 4, the first communication passage 31 is disposed closer to the center of the operational portion 3. With this arrangement, in the operational portion 3, the area near its outer circumference occupied by the first communication passage 31 may be rendered smaller, so reduction in the strength of the operational portion 3 may be suppressed. As a result, the durability of the hydro chuck 1 can be improved.

Further, in this embodiment, the first communication passage 31 and the first screw hole 20 formed coaxially therewith are provided with inclination to the side opposite to the shank portion 2 with respect to the direction perpendicular to the axis X of the chuck portion 4 and also perpendicular to the second face portion 7 and the screw member 22 is threaded in the first screw hole 20. With these, when the screw member 22 is operated by a wrench T from the outside of the operational portion 3, this wrench T can be operated with avoiding contact with an operational portion 3 of an adjacent hydro chuck 1. As a result, with this hydro chuck 1, the operability of the screw member 22 in the operational portion 3 can be improved. Further, the angle of the inclination of the first screw hole 20 may be set as any angle suitable for improvement of the operability of the screw member 22.

In the operational portion 3, the coolant hole 50 formed in the first face portion 6 is configured to be connectable to a supply source of coolant. The operational portion 3 includes a coolant passage 51 communicated to the coolant hole 50 for suppling coolant to the inner circumference side of the sleeve 12. This coolant passage 51 is provided to extend between the operational portion 3 and the shank portion 2.

With the above-described arrangement, in the hydro chuck 1, coolant can be supplied to the tool C from the operational portion 3 which is disposed in opposition to the chuck portion 4 of the tool mount B. For instance, with forming in the tool C a through hole along the axis X of the chuck portion 4, coolant can be discharged from the tool C toward the workpiece W. In the hydro chuck 1, since the operational portion 3 and the coolant hole 50 can be disposed on the same side spaced from the chuck portion 4 across the tool mount B, the operability can be improved. Further, in the hydro chuck 1, attachment/detachment of the tool C and adjustment of the length of the tool C for its protrusion can also be carried out easily without releasing the connection between the hydro chuck 1 and the coolant supply source.

In the hydro chuck 1, in the operational portion 3 thereof, there is provided the first communication passage 31 in which the screw member 22 (pressurizing piston) is accommodated. In this operational portion 3, for the sake of ensuring sufficient strength thereof, the first communication passage 31 may sometimes be disposed at a position close to the axis X. In this case, the coolant hole 50 to be formed in the operational portion 3 cannot be disposed at a position close to the axis X and its disposing position will be limited. Then, in this embodiment, in the operational portion 3 of the hydro chuck 1, the coolant hole 50 is provided at a position offset or away from the axis X. With this arrangement, it becomes possible for the coolant hole 50 to avoid interference with the first communication hole 31 or with the second screw hole 40 (air bleeding hole).

Second Embodiment

Figure 11:
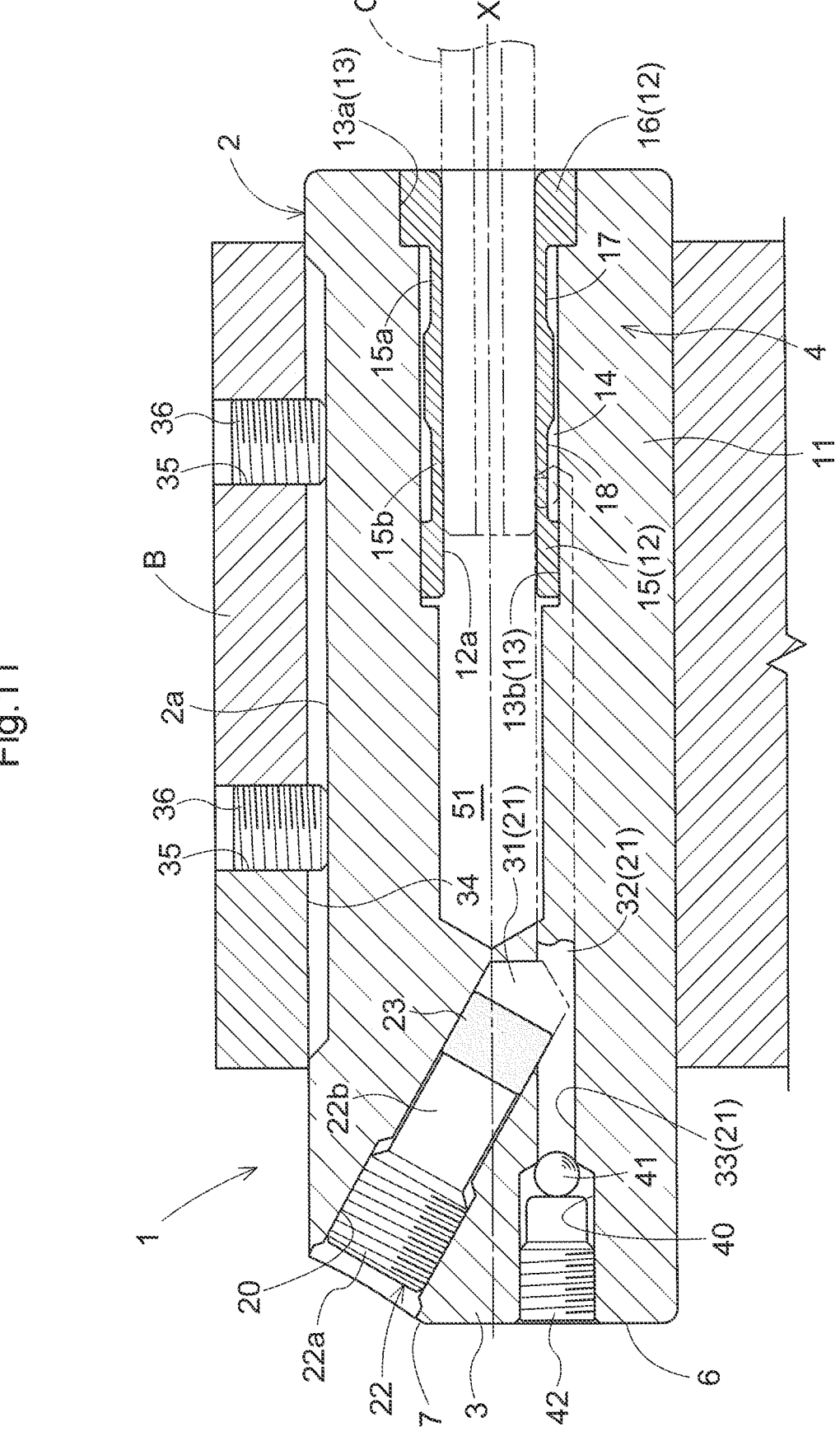
FIG. 11 is a section view showing a hydro chuck according to a second embodiment as being fixed to the tool mount.
Figure 12:
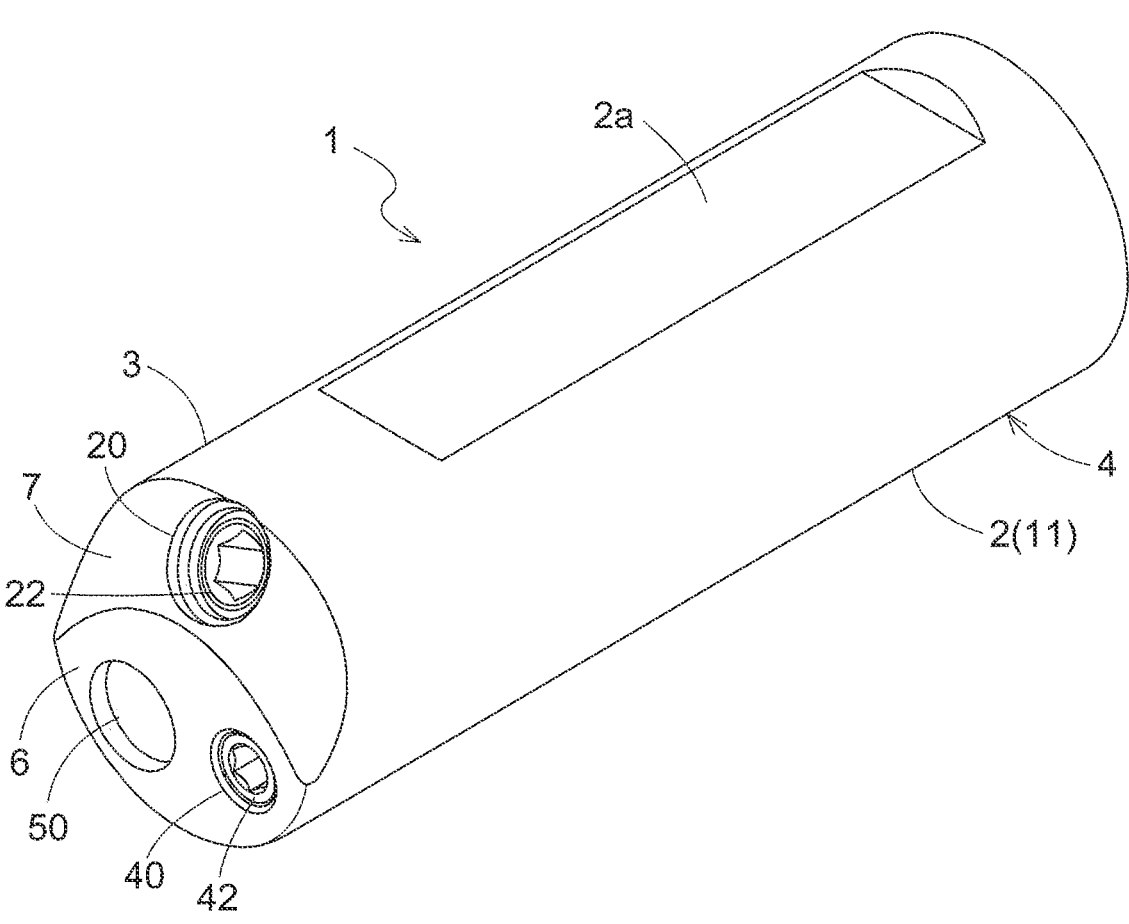
FIG. 12 is a perspective view of the hydro chuck of the second embodiment.
Figure 13:
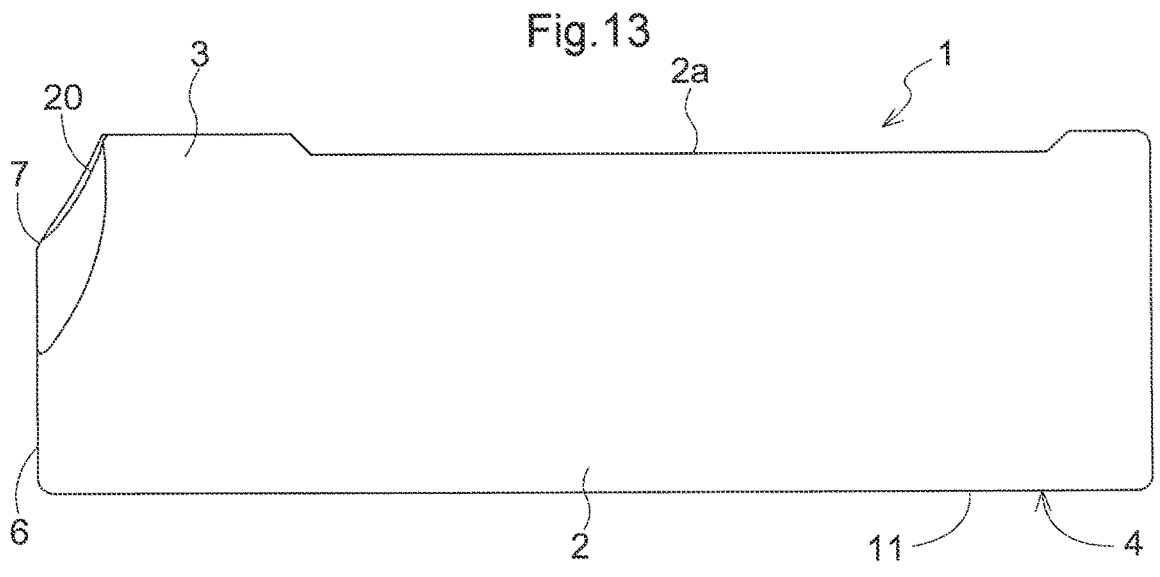
FIG. 13 is a front view of the hydro chuck of the second embodiment.
Figure 14:
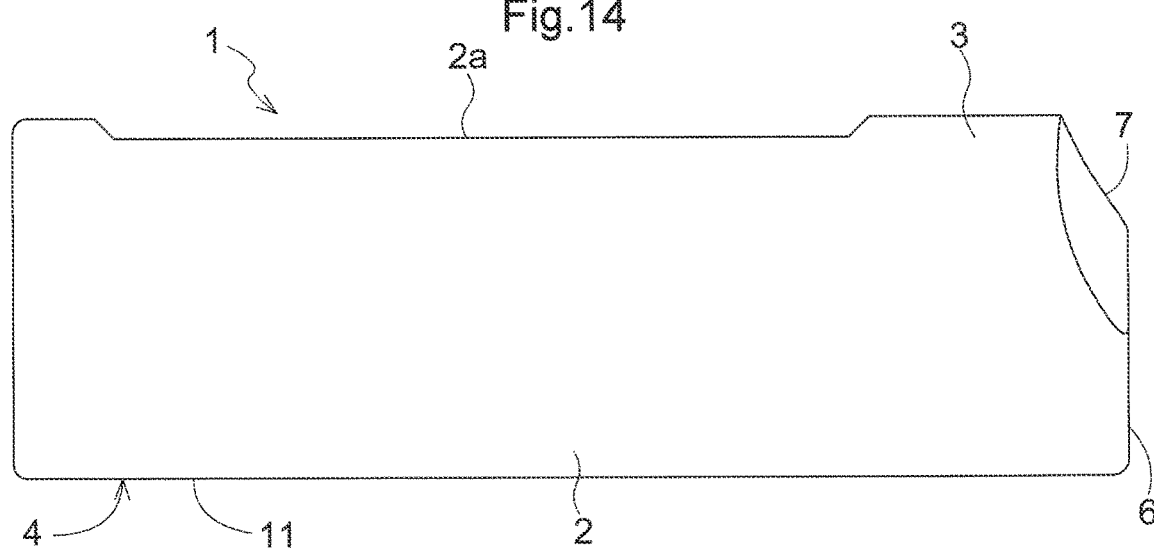
FIG. 14 is a rear view of the hydro chuck of the second embodiment.
Figure 15:
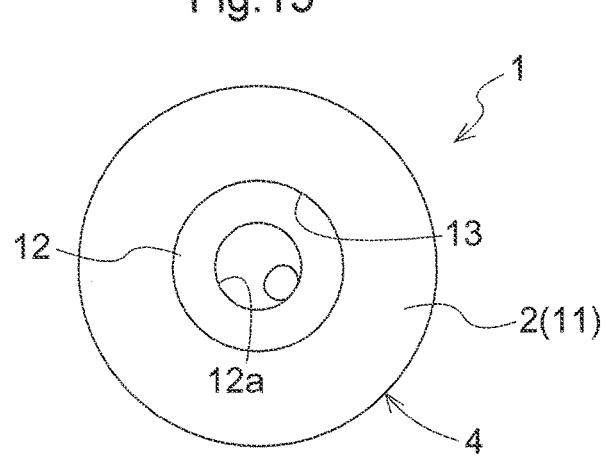
FIG. 15 is a right side view of the hydro chuck of the second embodiment.
Figure 16:
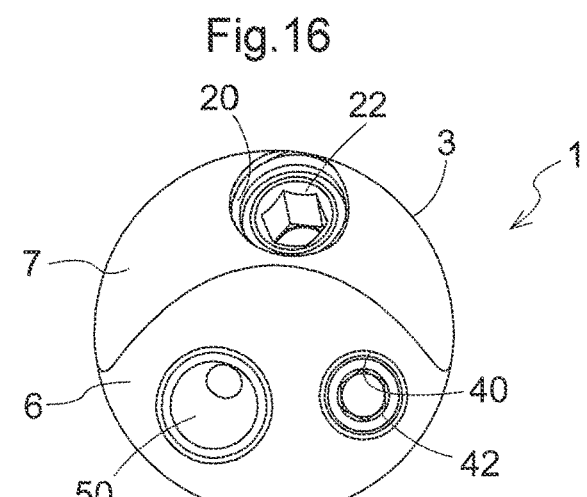
FIG. 16 is a left side view of the hydro chuck of the second embodiment.
Figure 17:
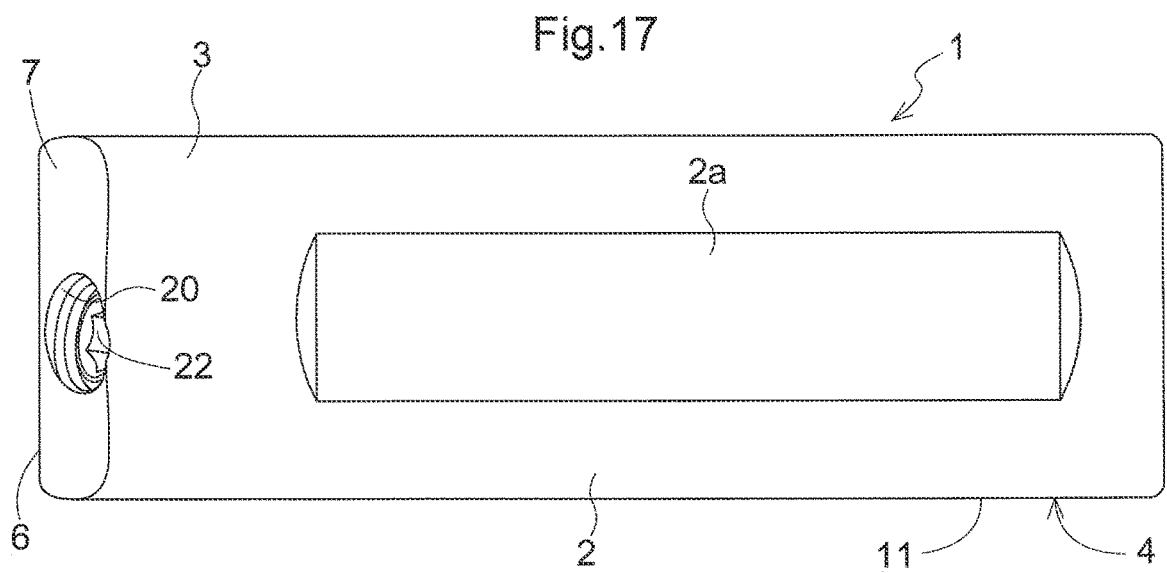
FIG. 17 is a plan view of the hydro chuck of the second embodiment.
Figure 18:
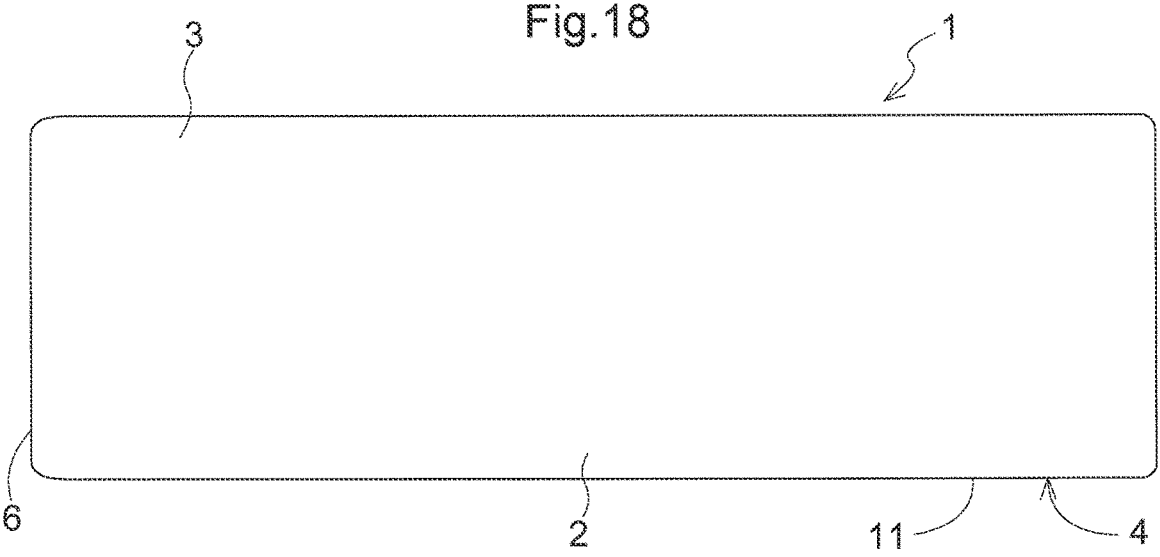
FIG. 18 is a bottom view of the hydro chuck of the second embodiment.

As shown in FIGS. 11-18, in the hydro chuck 1, the operational portion 3 may be formed in a form of a straight cylinder, with an approximately equal diameter to the shank portion 2. In the hydro chuck 1 shown in FIGS. 11-18, the outside diameter of the shank portion 2 of the hydro chuck 1 (first embodiment) shown in FIG. 2 is increased to a size approximately equal to the outside diameter of the operational portion 3, so that the operational portion 3 and the shank portion 2 are provided with approximately equal diameters. Accordingly, the chuck attaching hole 34 of the tool mount B shown in FIG. 11 is provided with a diameter larger than the diameter of the chuck attaching hole 34 of the tool mount B shown in FIG. 2. Further, though not shown, in the hydro chuck 1 of this embodiment, by reducing the outside diameter of the operational portion 3 of the hydro chuck 1 shown in FIG. 2 to a size approximately equal to the outside diameter of the shank portion 2, the operational portion 3 and the shank portion 2 may be provided with approximately equal diameters. In this case, in association with such reduction in the outside diameter of the operational portion 3 of the hydro chuck 1, in comparison with the first embodiment, the first communication passage 31 provided in the operational portion 3 may be formed shorter or this first communication passage 31 may be inclined more gently relative to the axis X than the first embodiment. The rest of the configuration is identical to that of the first embodiment.

In this embodiment, since the operational portion 3 is provided with the approximately equal diameter to the shank portion 2, to the chuck attaching hole 34 corresponding to the outside diameter of the shank portion 2, not only the shank portion 2 but also the operational portion 3 can be inserted. With this, when the hydro chuck 1 is to be mounted to the tool mount B, this may be inserted from the both sides without being interfered by the operational portion 3, thus allowing position adjustment in the direction along the axis X. As a result, the operability of the hydro chuck 1 to the tool mount B is improved, so that the degree of freedom in the position adjustment of the chuck portion 4 can be enhanced.

Figure 19:
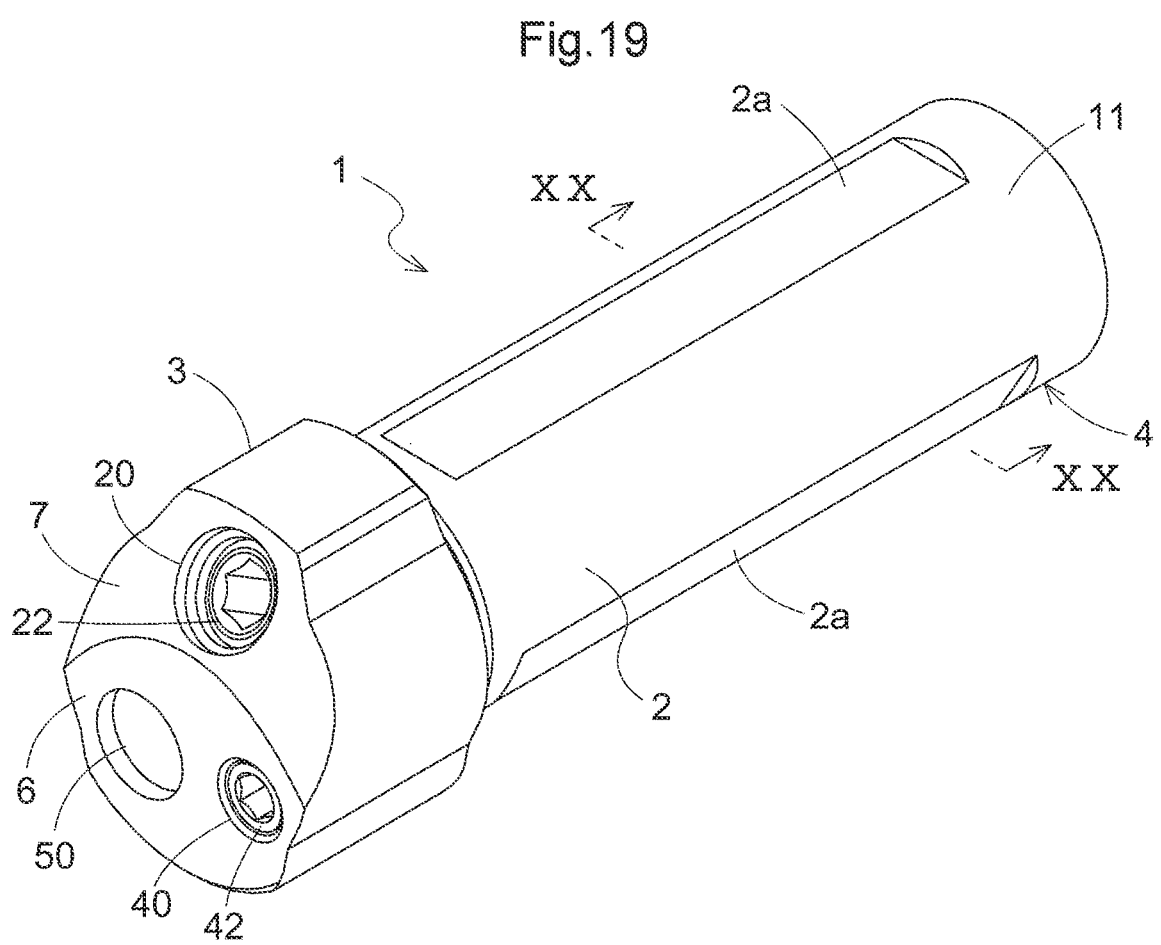
FIG. 19 is a perspective view of a hydro chuck according to a further embodiment.
Figure 20:
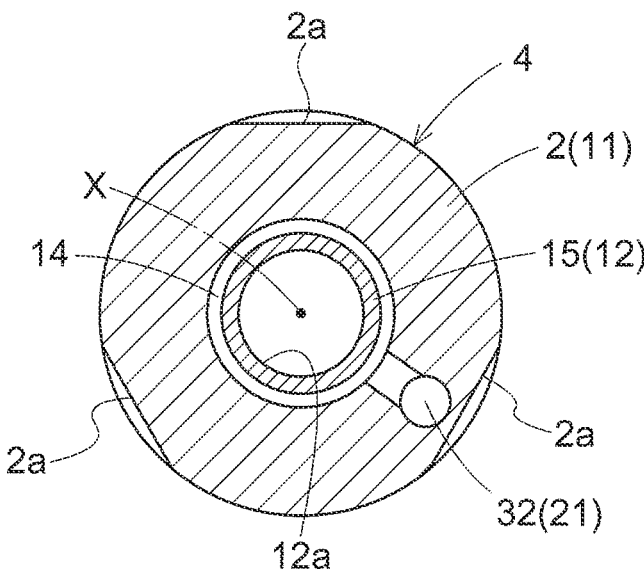
FIG. 20 is a section view taken along XX-XX in FIG. 19.

Other Embodiments (1) In the foregoing embodiments, there was disclosed the arrangement in which in the outer circumference face of the shank portion 2, the single flat face portion 2a is formed. Instead, a plurality of such flat face portions 2a may be formed. FIG. 19 and FIG. 20, there is shown an arrangement in which there are formed three flat face portions 2a spaced apart from each other in the circumferential direction in the outer circumferential face of the shank portion 2. At portions opposed to the flat face portions 2a across the axis in the outer circumferential face of the shank portion 2, portions of the outer circumferential face of the shank portion 2 are left and retained so as to be able to transmit effectively an input from the clamping screw 36. Further alternatively, in the outer circumferential face of the shank portion 2, two or more than four flat face portions 2a may be formed.

(2) In the case of the Swiss type automatic lathe A shown in FIG. 1, a further workpiece (not shown) may be disposed on the back face side of the tool mount B (the side opposite to the side where the workpiece W is disposed in FIG. 1), in addition to the front side of the tool mount B (the side where the workpiece W is disposed in FIG. 1) and such further workpiece may be machined also. In such case, a conventional type hydro chuck (not shown) having an operational portion on the outer circumference side of the chuck portion will be mounted to the tool mount B so that the chuck portion of the further hydro chuck is located on the back face side of the tool mount B. With such arrangement, in the tool mount B, on the back face side thereof, the operational portion 3 of the hydro chuck 1 and the chuck portion and the operational portion of the conventional hydro chuck will be disposed in close vicinity to each other. Thus, the operational portion 3 of the hydro chuck 1 will have its operational space restricted by the chuck portion and the operational portion of the adjacent conventional hydro chuck, thus imposing higher safety requirement. However, since operations of the operational portions of all of the hydro chucks are possible by the wrench T from the back face side of the tool mount B, there occurs no deterioration in the operability of the operational portions 3.

As described above, with provision of the plurality of flat face portions 2a in the chuck portion 4 of the hydro chuck 1, the flat face portion 2a to be pressed by the clamping screw 36 may be changed and the direction of the screw member 22 in the operational portion 3 of the hydro chuck 1 may be changed. With this, the direction of the screw member 22 for the respective plurality of operational portions 3 can be adjusted to an angle suitable for the operation of the wrench T.

(3) In the foregoing embodiments, there was disclosed the arrangement in which the flat face portion 2a is formed in the outer circumferential face of the shank portion 2. However, in the hydro chuck 1, no such flat face portion 2a may be formed in the outer circumferential face of the shank portion 2.

(4) In the hydro chuck 1 of the first embodiment, there was disclosed the arrangement in which the operational portion 3 includes the portion 3a which protrudes radially outwards beyond the shank portion 2 and this portion 3a is provided along the entire circumference of the operational portion 3. Instead of this, in the hydro chuck 1, the portion 3a of the operational portion 3 protruding radially outwards beyond the shank portion 2 may be provided only at a part of the whole circumference.

(5) In the foregoing embodiments, there was disclosed the arrangement in which the sleeve 12 included in the chuck portion 4 is provided as a separate component from the shank portion 2. Instead, the sleeve 12 may be formed unitarily as a part of the shank portion 2.

(6) In the foregoing embodiments, in the hydro chuck 1, there was disclosed the arrangement in which the operational portion 3 includes the coolant hole 50 and the coolant passage 51 continuous with the coolant hole 50 and communicated to the inner circumference side of the sleeve 12. In place of the above arrangement, the hydro chuck 1 may be configured such that in the tubular portion 11 of the chuck portion 4, a discharging hole is formed from its leading end along the axis X and the coolant passage 51 is communicated to this discharging hole. In this case, coolant supplied from the coolant supply source via this coolant hole 50 to the coolant passage 51 will be discharged via the discharging hole formed in the tubular portion 11 toward the outer face of the tool C or the workpiece W. The coolant passage 51 and the above-described discharging hole may be provided with desired inclinations relative to the axis X. In this case, the coolant can be discharged to more appropriate positions in accordance with specific required working conditions of the workpiece W. Further alternatively, in place of the coolant passage 51 and the discharging hole described above, slits may be formed in the inner circumferential face of the sleeve 12.

INDUSTRIAL APPLICABILITY

The present invention can be used broadly for hydro chucks that can be mounted to a tool mount of a machine tool.

DESCRIPTION OF SIGNS

1: hydro chuck
2: shank portion
2*a*: flat face portion
3: operational portion
4: chuck portion
6: first face portion
7: second face portion
11: tubular portion
12: sleeve
13: sleeve receiving portion
14: fluid pressure chamber
20: first screw hole
21: communication passage
22: screw member (pressurizing piston)
31: first communication passage
32: second communication passage
33: third communication passage
34: chuck attaching hole
35: screw hole
36: clamping screw
40: second screw hole (air bleeding hole)
41: ball member
42: screw member
50: coolant hole
51: coolant passage
A: Swiss type automatic lathe
B: tool mount (tool post)
C: cutting tool (gripped object)
T: wrench
W: workpiece (work)
X: axis

The invention claimed is:

1. A hydro chuck comprising:
a shank portion provided on one end side in a longitudinal direction and having, on a leading end side thereof, a cylindrical chuck portion for gripping a gripped object;
an operational portion provided on the other end side in the longitudinal direction and disposed in continuation from the shank portion;

the shank portion being non-rotatably fixable by being inserted to a tool mount included in a machine tool;
the operational portion being provided at a position on a side opposite to the chuck portion across the tool mount and not opposed to a workpiece to be worked, with the shank portion being inserted to the tool mount;
the gripped object being insertable from the side of the chuck portion toward the side of the operational portion;
the chuck portion including a sleeve gripping the gripped object and a fluid pressure chamber formed on an outer circumference side of the sleeve and filled with fluid, the chuck portion being configured such that in association with a rise of a pressure of the fluid inside the fluid pressure chamber, the sleeve is reduced in its diameter to grip the gripped object;
the operational portion including a communication passage communicated to the fluid pressure chamber, a pressurizing piston disposed in the communication passage and adjusting the pressure of the fluid inside the fluid pressure chamber, a coolant hole connectable to a supply source of coolant and a coolant passage communicated to the coolant hole and supplying the coolant to the inner circumference side of the sleeve,
wherein, of the communication passage, a first communication passage accommodating the pressurizing piston and extending along an operational direction of the pressurizing piston is provided with an inclination toward a side opposite to the shank portion, relative to a direction perpendicular to a longitudinal axis of the chuck portion and traverses the axis of the chuck portion, such that if a plurality of hydro chucks is mounted to the tool mount and with the hydro chucks adjacent to each other, a tool for operating the pressurizing piston of a first hydro chuck does not come into contact with the operational portion of a second hydro chuck adjacent the first hydro chuck, and
an opening of the coolant hole and an opening of a screw hole in which the pressurizing piston is attached are adjacent each other and on a same side in the operational portion as seen in a direction of the axis of the chuck portion and are operable from a same direction, with the shank portion being inserted into the tool mount.

2. A hydro chuck comprising:
a shank portion provided on one end side in a longitudinal direction and having, on a leading end side thereof, a cylindrical chuck portion for gripping a gripped object;
an operational portion provided on the other end side in the longitudinal direction and disposed in continuation from the shank portion;
the shank portion being non-rotatably fixable by being inserted through a tool mount included in a machine tool and is fixed mechanically to the tool mount;
the operational portion being provided at a position on a side opposite to the chuck portion across the tool mount and not opposed to a workpiece to be worked, with the shank portion being inserted through the tool mount;
the gripped object being insertable from the side of the chuck portion toward the side of the operational portion;
the chuck portion including a sleeve gripping the gripped object and a fluid pressure chamber formed on an outer circumference side of the sleeve and filled with fluid, the chuck portion being configured such that in association with a rise of a pressure of the fluid inside the fluid pressure chamber, the sleeve is reduced in its diameter to grip the gripped object; and the operational portion including a communication passage communicated to the fluid pressure chamber, a pressurizing piston disposed in the communication passage and adjusting the pressure of the fluid inside the fluid pressure chamber, and a portion which protrudes radially outward beyond the shank portion and which has a radially-extending surface configured to come into contact with a radially-extending outer face of the tool mount when the shank portion is inserted through the tool mount wherein, of the communication passage, a first communication passage accommodating the pressurizing piston and extending along an operational direction of the pressurizing piston is provided with an inclination toward a side opposite to the shank portion, relative to a direction perpendicular to a longitudinal axis of the chuck portion and traverses the axis of the chuck portion.

\* \* \* \* \*